United States Patent
Jain et al.

(10) Patent No.: US 11,695,711 B2
(45) Date of Patent: Jul. 4, 2023

(54) ADAPTIVE COMMUNICATIONS DISPLAY WINDOW

(71) Applicant: International Business Machines Corporation, Armonk, NY (US)

(72) Inventors: Mohit Jain, Bangalore (IN); Ramachandra Kota, Hyderabad (IN); Pratyush Kumar, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1021 days.

(21) Appl. No.: 15/481,291

(22) Filed: Apr. 6, 2017

(65) Prior Publication Data

US 2018/0295071 A1 Oct. 11, 2018

(51) Int. Cl.
*H04L 51/02* (2022.01)
*G06F 3/0482* (2013.01)
*G06F 16/332* (2019.01)
*G06F 40/35* (2020.01)

(52) U.S. Cl.
CPC .......... *H04L 51/02* (2013.01); *G06F 16/3329* (2019.01); *G06F 40/35* (2020.01)

(58) Field of Classification Search
CPC ....... H04L 51/02; G06F 16/3329; G06F 40/35
USPC ...................................................... 715/752
See application file for complete search history.

(56) References Cited

U.S. PATENT DOCUMENTS

| 7,149,983 | B1 | 12/2006 | Robertson et al. |
| 7,756,855 | B2* | 7/2010 | Ismalon ............... G06F 16/3322 |
| | | | 707/713 |
| 8,156,060 | B2 | 4/2012 | Borzestowski et al. |
| 9,037,567 | B2 | 5/2015 | Wissner et al. |
| 9,311,364 | B2 | 4/2016 | Curtis |
| 9,424,233 | B2 | 8/2016 | Barve et al. |
| 10,162,817 | B2* | 12/2018 | Schlesinger ............... G06F 8/34 |
| 10,733,993 | B2* | 8/2020 | Kudurshian .......... G06F 16/951 |
| 2006/0150119 | A1 | 7/2006 | Chesnais et al. |
| 2006/0229862 | A1* | 10/2006 | Ma ........................ G06F 3/038 |
| | | | 704/4 |
| 2007/0143485 | A1 | 6/2007 | Da Palma et al. |

(Continued)

FOREIGN PATENT DOCUMENTS

WO WO2014031451 A1 2/2014
WO WO2015085404 A1 6/2015

*Primary Examiner* — Yongjia Pan
(74) *Attorney, Agent, or Firm* — Ference & Associates LLC

(57) ABSTRACT

One embodiment provides a method, including: utilizing at least one processor to execute computer code that performs the steps of: providing, on a display device, a communications window, wherein the communications window comprises a request for user input to start a conversation with an online assistant; receiving a user input identifying a request by the user to be completed by the online assistant; updating, based upon the request, the communications window, wherein the updated communications window comprises a summary of the conversation including prepopulated variable terms and allows user interaction to adjust the summary including adjustment of the prepopulated variable terms; and iteratively updating the communications windows based upon user input adjusting the summary. Other aspects are described and claimed.

10 Claims, 4 Drawing Sheets

(56) References Cited

U.S. PATENT DOCUMENTS

| | | | |
|---|---|---|---|
| 2007/0192085 A1* | 8/2007 | Roulland | G06F 16/3329 |
| | | | 704/9 |
| 2008/0201434 A1* | 8/2008 | Holmes | H04L 51/04 |
| | | | 709/206 |
| 2011/0213642 A1 | 9/2011 | Makar et al. | |
| 2012/0041903 A1 | 2/2012 | Beilby et al. | |
| 2012/0296926 A1 | 11/2012 | Kalin et al. | |
| 2013/0283168 A1* | 10/2013 | Brown | G06F 3/165 |
| | | | 715/728 |
| 2014/0108453 A1 | 4/2014 | Venkataraman et al. | |
| 2014/0122056 A1* | 5/2014 | Duan | G06F 40/35 |
| | | | 704/9 |
| 2014/0172912 A1 | 6/2014 | Morris | |
| 2014/0214820 A1* | 7/2014 | ODonnell | G06F 16/3329 |
| | | | 707/726 |
| 2014/0243028 A1* | 8/2014 | Colombo | H04L 51/063 |
| | | | 455/466 |
| 2014/0279050 A1 | 9/2014 | Makar et al. | |
| 2014/0280290 A1* | 9/2014 | Baumgartner | G06F 16/3323 |
| | | | 707/767 |
| 2016/0078456 A1 | 3/2016 | Chakraborty et al. | |
| 2016/0154544 A1* | 6/2016 | Van Os | G06F 3/04842 |
| | | | 715/835 |
| 2016/0267128 A1* | 9/2016 | Dumoulin | G06F 16/3329 |
| 2016/0285816 A1* | 9/2016 | Schmid | H04L 67/306 |
| 2017/0091211 A1* | 3/2017 | Kozlov | G06F 16/90324 |
| 2017/0098159 A1* | 4/2017 | Sharifi | G06F 3/0481 |
| 2017/0187654 A1* | 6/2017 | Lee | G06F 40/274 |
| 2017/0242913 A1* | 8/2017 | Tijssen | G06F 40/247 |
| 2018/0083894 A1* | 3/2018 | Fung | H04L 51/08 |
| 2018/0196854 A1* | 7/2018 | Burks | G06F 3/04886 |

\* cited by examiner

ADAPTIVE COMMUNICATIONS DISPLAY WINDOW

BACKGROUND

Many companies or entities use conversational windows, also referred to herein as chatbots, which allow users to interact with an online assistant. Chatbots typically conduct a conversation with the user in a manner similar to how another person would engage in the conversation. For example, a user may access an account and have a question regarding the information associated with the account. Rather than calling or emailing the account provider, the user may access a chatbot which allows the user to interact with an online assistant through the conversational system. As another example, some restaurants provide chatbots which allow a user to place an order for food using the chatbot rather than calling the restaurant.

BRIEF SUMMARY

In summary, one aspect of the invention provides a method, comprising: utilizing at least one processor to execute computer code that performs the steps of: providing, on a display device, a communications window, wherein the communications window comprises a request for user input to start a conversation with an online assistant; receiving a user input identifying a request by the user to be completed by the online assistant; updating, based upon the request, the communications window, wherein the updated communications window comprises a summary of the conversation including prepopulated variable terms and allows user interaction to adjust the summary including adjustment of the prepopulated variable terms; and iteratively updating the communications windows based upon user input adjusting the summary.

Another aspect of the invention provides an apparatus, comprising: at least one processor; and a computer readable storage medium having computer readable program code embodied therewith and executable by the at least one processor, the computer readable program code comprising: computer readable program code that provides, on a display device, a communications window, wherein the communications window comprises a request for user input to start a conversation with an online assistant; computer readable program code that receives a user input identifying a request by the user to be completed by the online assistant; computer readable program code that updates, based upon the request, the communications window, wherein the updated communications window comprises a summary of the conversation including prepopulated variable terms and allows user interaction to adjust the summary including adjustment of the prepopulated variable terms; and computer readable program code that iteratively updates the communications windows based upon user input adjusting the summary.

An additional aspect of the invention provides a computer program product, comprising: a computer readable storage medium having computer readable program code embodied therewith, the computer readable program code executable by a processor and comprising: computer readable program code that provides, on a display device, a communications window, wherein the communications window comprises a request for user input to start a conversation with an online assistant; computer readable program code that receives a user input identifying a request by the user to be completed by the online assistant; computer readable program code that updates, based upon the request, the communications window, wherein the updated communications window comprises a summary of the conversation including prepopulated variable terms and allows user interaction to adjust the summary including adjustment of the prepopulated variable terms; and computer readable program code that iteratively updates the communications windows based upon user input adjusting the summary.

A further aspect of the invention provides a method, comprising: utilizing at least one processor to execute computer code that performs the steps of: providing a chatbot display window allowing a user to interact with an online assistant, wherein the chatbot display window requests user input; receiving, at the chatbot, user input providing instructions to the online assistant; updating, based upon the user input, the chatbot display window, wherein the updated chatbot display window comprises (i) a returned result based upon the instructions and (ii) a summary including the instructions comprising additional user adjustable terms, wherein the user adjustable terms are populated based upon an inferred user intent; and iteratively updating the chatbot display window based upon the user providing selections for the user adjustable terms.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
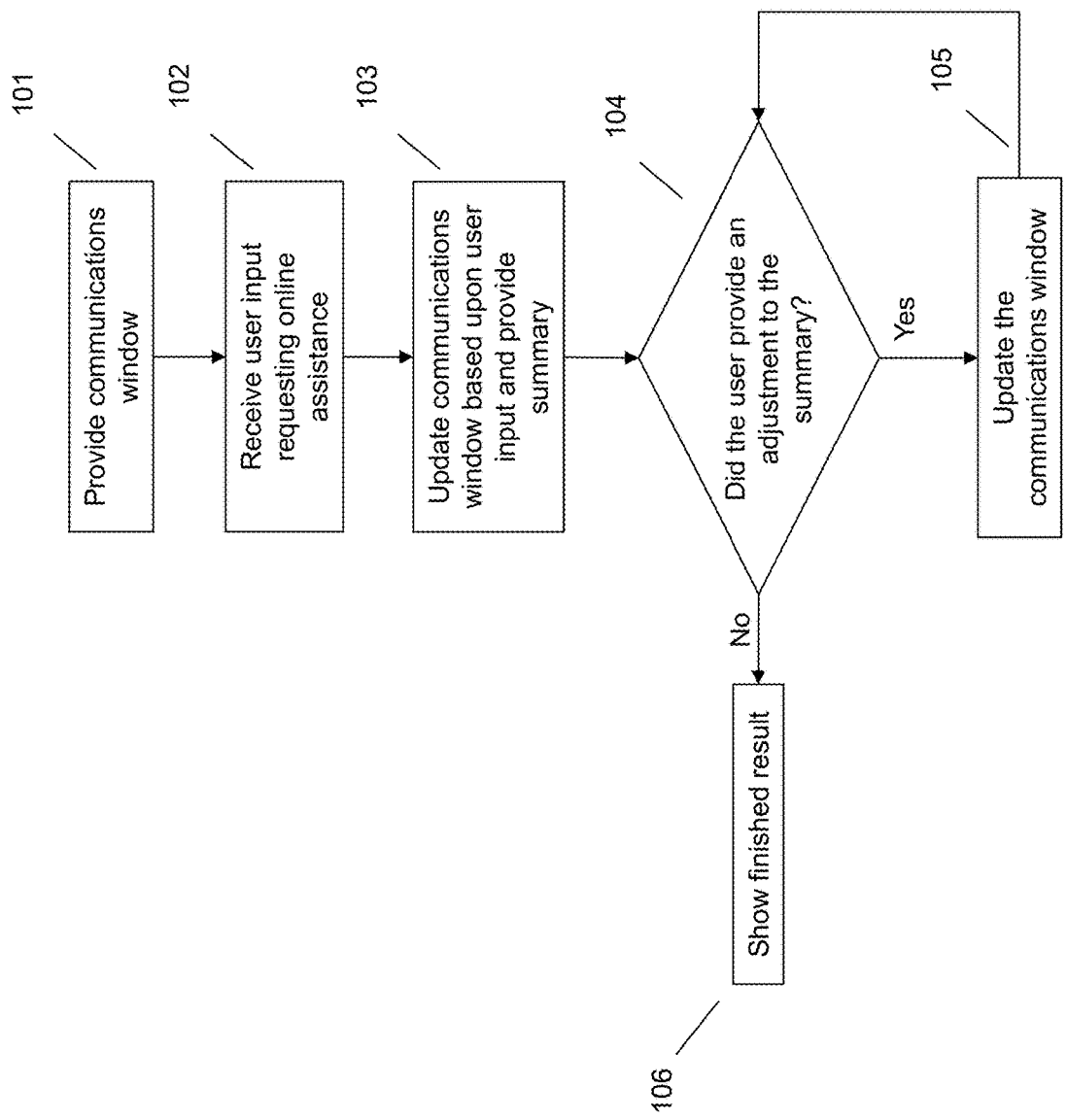
FIG. 1 illustrates a method of adapting a communications window based upon inferred user intent and user input.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The artificial intelligence that chatbots use now allows the conversation to become more accurate and closer to a conversation with another person. For example, the natural language generation and understanding has improved so that the chatbot system can more accurately identify the user request and provide a more accurate response or result. Additionally, using data analytics and collaborative filtering has also made the conversation system more accurate and more human-like. However, the actual user interface of the chatbot has remained substantially the same. The chatbot interface has traditionally been developed to mimic human conversation.

For example, a traditional chatbot interface appears similar to a messaging application where a person provides input which results in a message bubble. The benefits to such an interface are that it is intuitive, flexible, and has a familiar interface. In other words, since the system functions similar to a human conversation, a person can quickly learn how to use the chatbot. One problem with such an interface is that it is non-persistent, meaning as the conversation continues, messages or input eventually are removed from the messaging display. Another problem is that it is difficult for a user to modify his/her intent. For example, if a user is ordering a pizza using a chatbot and the user changes his/her mind about the type of pizza he/she wants, the user typically has to start the entire conversation over. A third problem is that the chatbot conversation is typically very cumbersome resulting in very lengthy chats to reach the desired outcome. An additional problem is that the chatbot is programmed in a particular manner, making some of the conversation ambiguous. For example, using the pizza example above, the chatbot is generally programmed to assume the user wants a single pizza. If the user wants more than one pizza, he/she must continue the conversation to order the second pizza, even if the second pizza is the same as the first.

Another type of traditional chatbot interface is similar to a form where a user selects radial buttons or selections to make choices and provide input. Some advantages to these types of interfaces are that they are persistent, easy for a user to modify if the user changes his/her mind, fairly quick to user, and non-ambiguous. However, these types of interfaces are not as intuitive as the conversational chatbot, because the user is not provided any input in the form of a prompt. Rather, the user must look at the form and figure out how to provide the desired information. Another problem with this type of interface is that it is inflexible, meaning if a user does not like any of the choices, he/she is unable to provide any different type of input to change the choice. An additional problem is that this type of chatbot is application specific and requires an interface specific to that application. In other words, a programmer has to program each of these chatbots for the specific application that it will be used in.

Accordingly, an embodiment provides a system and method for an adaptive communications display window that allows a user to modify assumptions and intent throughout the conversation. The system may provide a communications window which includes a request for user input to start a conversation with an online assistant. For example, the communications window may be a popup window asking the user if they need any assistance. As another example, the communications window may be a split screen window asking the user what kind of food he/she would like to order. The system may receive user input identifying a request by the user to be completed by the online assistant. For example, the user may provide input indicating they need assistance finding a particular item. As another example, the user may provide input indicating the type of food they would like to order.

Based upon the user input, the system updates the communications window with a summary of the conversation. The summary may include prepopulated variable terms. The prepopulated variable terms may be populated based upon user history, crowd-sourced information, and the like. The display window may also allow user interaction with the summary and the prepopulated variable terms. For example, the user may select one of the variable terms to change the term. As the user provides additional user input, the system may iteratively update the display window to show the updated intent of the user. Additionally, the system may update the display window to show results of the user request. For example, if the user requested assistance in finding a particular item, the display window may be updated to show the results which match the requested item.

Such a system provides a technical improvement over current chatbot systems. The systems and methods as described herein provide a chatbot interface that is easy for a user to adapt to changing user intent. Additionally, the chatbot interface is persistent so that a user can quickly see what the system has inferred as the user intent. The user can then modify any terms in order to more clearly identify the actual intent of the user. The chatbot interface can be applied to any application, which provides a non-application specific interface and also an interface that becomes familiar to a user over multiple applications instead of learning a chatbot interface for each specific application. Accordingly, the systems and methods as described herein provide an adaptive communications display window that is easy to use by the user and easy to adapt to the user's intent, unlike previous chatbot interfaces.

Referring now to FIG. 1, at 101, the system may provide, on a display device, a communications window including a request for user input to start a conversation with an online assistant. For example, the communications window may provide a prompt to a user asking if the user needs assistance, if the user wants to try a particular item, or the like. The communications window may be similar to a messaging application window or other applications in which a user communicates with another entity. For example, referring to FIG. 2, the layout of the communications window 200 may include a prompt 201 at the top of the window and a user input section 202 at the bottom of the window.

Figure 2:
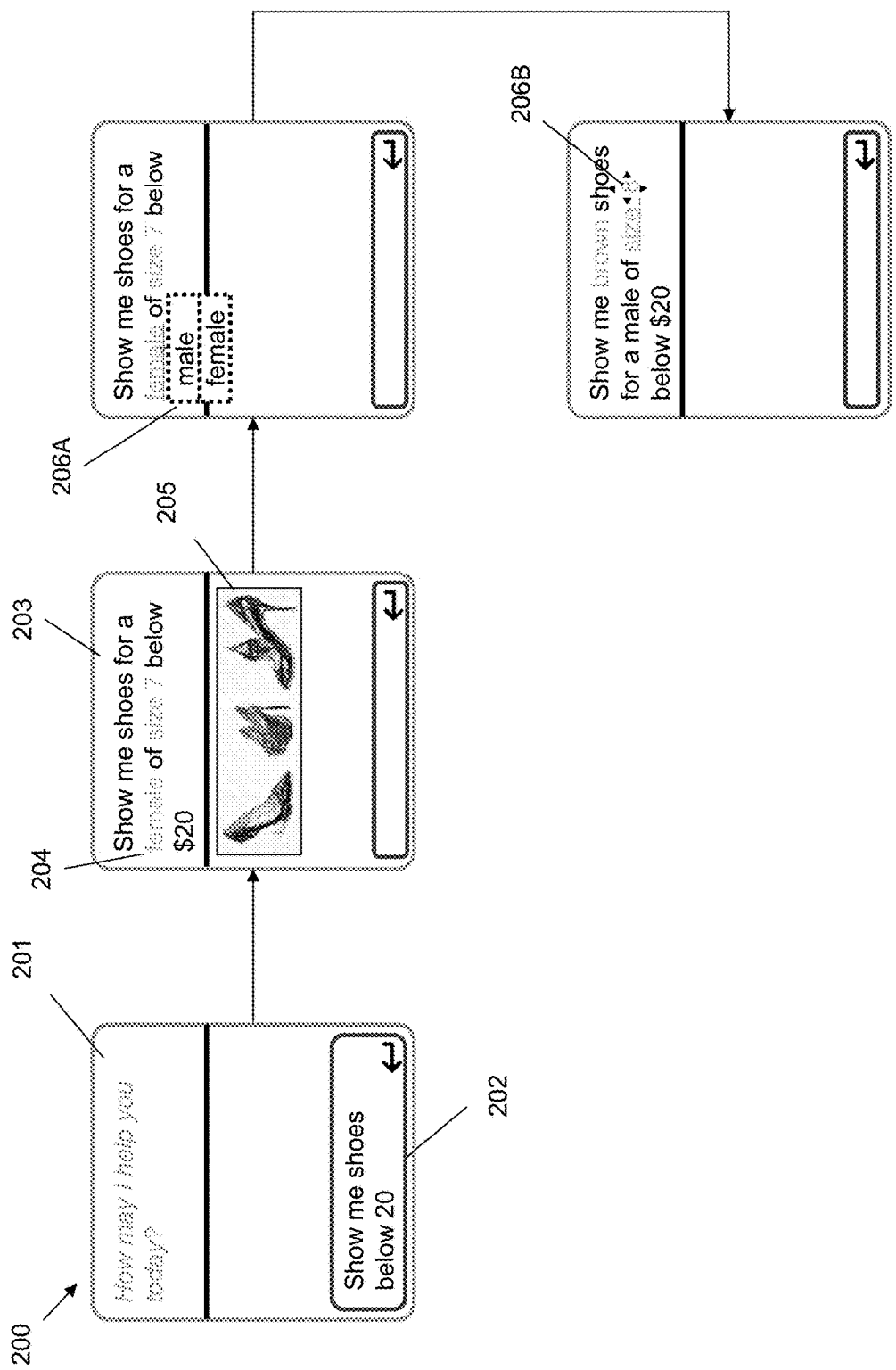
FIG. 2 illustrates an example use case of an adaptive communications window.
Figure 3:
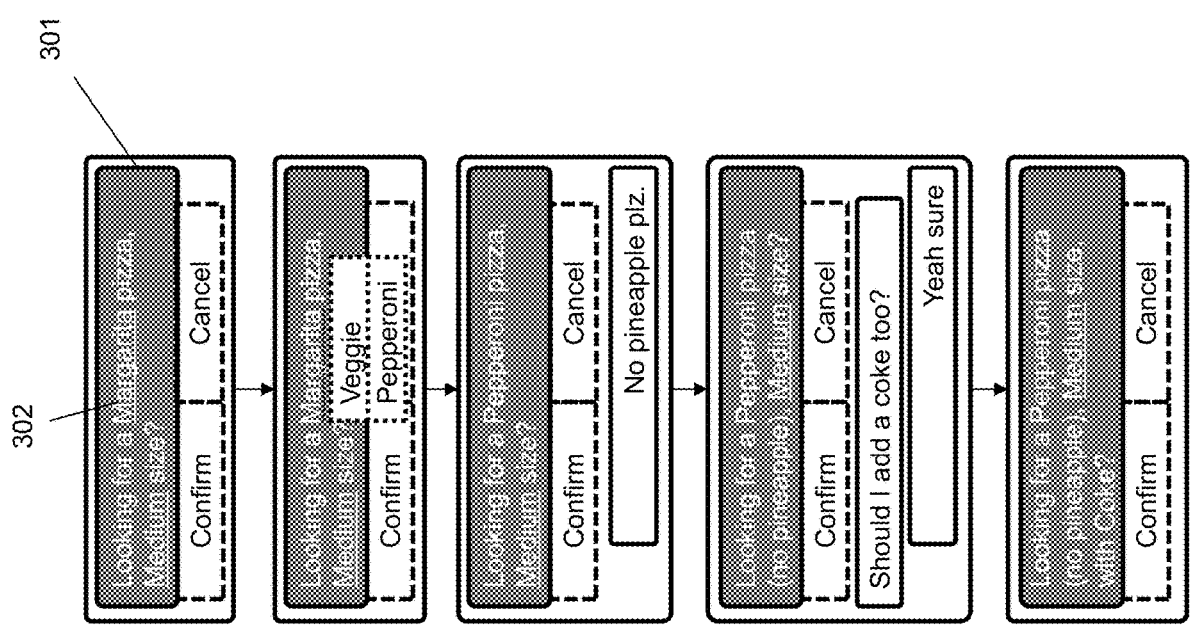
FIG. 3 illustrates an example use case of an adaptive communications window.

FIG. 2 illustrates an example use case of the described system in a conversational type view where results are additionally displayed in the communications window. FIG. 3 illustrates a different example use case of the described system in a conversational type view where a summary of the conversation is displayed along with a confirmation or cancel button. The displays of FIG. 2 and FIG. 3 are merely examples. Different layouts, prompts, and designs are contemplated and possible. For example, the communications window may be integrated into a webpage where the user prompt is provided similar to a search field and the webpage is updated based upon user input. Different types of applications may have different layouts and prompts based upon the application. For example, a restaurant application may provide a prompt asking the user if they want to try a particular item, whereas a services application may ask the user if they need any assistance. In other words, the display and prompts may be customized for the particular application using the communications window or chatbot.

At 102, the system may receive user input identifying a request by the user to be completed by the online assistant. In other words, the user may provide input requesting that the system perform some action. For example, the user may request assistance in understanding something within the application. As another example, the user may request assistance finding a particular item or items matching a particular request. As a further example, the user may provide input to place an order for a food item. For example, referring back to FIG. 2, the user may provide input at the user input section 202 requesting "Show me shoes below 20."

At 103, the system may update the communications window based upon the request by the user. The communications window may be updated to show a summary of the conversation, for example, as shown in FIG. 2 at 203 and in FIG. 3 at 301. The summary may also include prepopulated variable terms, for example, as shown in FIG. 2 at 204 and in FIG. 3 at 302. The communications window additionally allows user interaction and allows a user to adjust the summary and/or the prepopulated variable terms to adjust the intent of the user. Thus, the system provides a user interface with a persistent intent view allowing the user to view and understand the assumptions of the system and a summary of the conversation thus far. As described in more detail below, the persistent intent view iteratively gets updated as the user provides additional user input.

The summary and prepopulated variable terms are generated using a back-end engine. The back-end engine annotates the user input with different data-types. The data-types identify the type of data associated with different elements in the user input. For example, the back-end engine can identify if an element or term in the user input is associated with a price, color, size, type, date, enumerated options, free-text, and the like. As an example, the back-end engine may identify a number within the user input is associated with a particular price or price range.

The back-end engine may also generate and/or identify the prepopulated variable terms or user-select-phrases (USPs), which the back-end engine may also annotate with a data-type. Some of the USPs may be based upon the user request or input. Using the example of FIG. 2, the user request includes a price range below $20. Even though the user has provided this term, the system may still treat it as a variable term, meaning the user may later change the term. For USPs that the user has not provided or selected, the system may generate or provide the USPs using a history associated with the user. For example, if a user logs into a shopping account, the system may use the user's past search or purchase history to provide the USPs. Referring to the example of FIG. 2, the USPs which have been prepopulated by the system based upon something other than direct user input are shown in gray, for example, at 204. These USPs may be based upon the user's history of shopping for shoes for a female of size 7.

The USPs may also be based upon crowd-sourced information. For example, the system may identify the most popular terms and prepopulate these terms. As an example, referring to FIG. 3, the system may identify that the most popular type of pizza bought is a Margarita pizza. Accordingly, the system has prepopulated the pizza type as Margarita. In FIG. 3, the prepopulated variable terms that have not been explicitly identified by the user are shown as underlined terms. It should be noted that more than the grayed terms of FIG. 2 and the underlined terms of FIG. 3 may be selectable for modification by a user. For example, in FIG. 2, the user may select the $20 term for modification in addition to the grayed terms. Using crowd-sourced information may also include using crowd-sourced information having particular parameters. For example, the system may identify the most popular terms for a particular day, time, based upon user attributes, and the like. The prepopulated variable terms may also be based upon additional or alternative data, for example, historical data of the system, business rules, data from the application, and the like.

The prepopulated variable terms may also be associated with an uncertainty score. The uncertainty score may identify how certain the back-end engine is that the term(s) should be as selected. For example, the system may use a user history to select the USPs and may identify that the user sometimes shops for black shoes, sometimes for brown shoes, and sometimes for other color shoes. Thus, the system may associate an uncertainty score with the color of the shoe. If the uncertainty score is above a particular threshold, the system may request clarification from the user. In other words, the back-end engine attempts to determine the user intent based upon the user request and other information accessible to the system.

If the back-end engine identifies a term that is uncertain, the system may request that the user provide clarification on what the actual intent of the user is. The clarification may be presented in the form of a pop-up window in the communications window. The clarification may also be presented as a term in a particular color indicating the user needs to select the appropriate term. The clarification may include a question having suggested answers. The user may be given the option of dismissing the clarification. In the case that the user does not provide an answer to the clarification, the system may select the highest ranked suggestion for population into the summary.

If a user selects, highlights, rolls-over, or otherwise indicates a selection of one of the prepopulated variable terms, the system may provide overlaid suggestions for modifying the term. For example, referring to FIG. 2, when the user selects the USP "female" the system displays suggestions of "male" and "female,", as shown at 206A. These suggestions are overlaid with the communications window. When the user identifies or selects a term for adjustment, the system may provide a selector for adjusting the term. As described above, the selector may include different suggestions. Alternatively, the selector may include arrows, as shown at 206B, graphs, for example, for selecting a price range, color palette (e.g., for selecting a color, etc.), and the like. The annotated data-type associated with the term may determine the type of selector that is provided for adjusting the prepopulated variable term. For example, if the annotated data-type is a price, the system may provide a graph or arrow selectors for adjusting the price. As another example, if the annotated data-type is a color, the system may provide a color palette for selecting the desired color.

The updated communications window may include a displayed result. For example, if a user was requesting assistance in locating a particular item or items matching some parameters, the system may present these results in the communications window. As an example, referring to FIG. 2, the system may provide the results as shown at 205. As the user updates or adjusts the different terms and/or summary the results may be updated to reflect the new request or intent of the user.

At 104 the system may identify whether the user provided an adjustment to one or more of the prepopulated variable terms. If the user did provide an adjustment to one or more of the prepopulated variable terms, the system may update the communications window at 105. As discussed before, the update of the window may include results based upon the user input, in this case, the updated user input. Additionally, the update of the summary may include changing an attribute associated with the variable term (e.g., typeset, underline, font color, highlighting, etc.) to designate the term as explicitly selected by the user. The system may then return back to 104 to determine if the user has provided additional adjustment and/or input. The communications window may be iteratively updated at 105 based upon the user providing additional input and/or adjustment of the summary and/or terms.

If/when the user does not provide any additional adjustment at 104, the system may show the finished result at 106. The finished result may include a summary of the conversation and a request for confirmation, for example, if a user is placing an order. The finished result may include final search results based upon the user input, for example, for a user who is searching for a particular item. The finished results may merely include a parting remark from the system, for example, if the user was requesting assistance in using or understanding a product, application, service, or the like. Accordingly, the described systems and methods provide a data-driven adaptive interface for a conversational system, which identifies user intent to populate variable terms that can be adjusted by a user. The system also provides a system in which the user is provided the summary so the user can identify the assumptions by the system and is able to quickly identify the status of the conversation with the online assistant.

Figure 4:
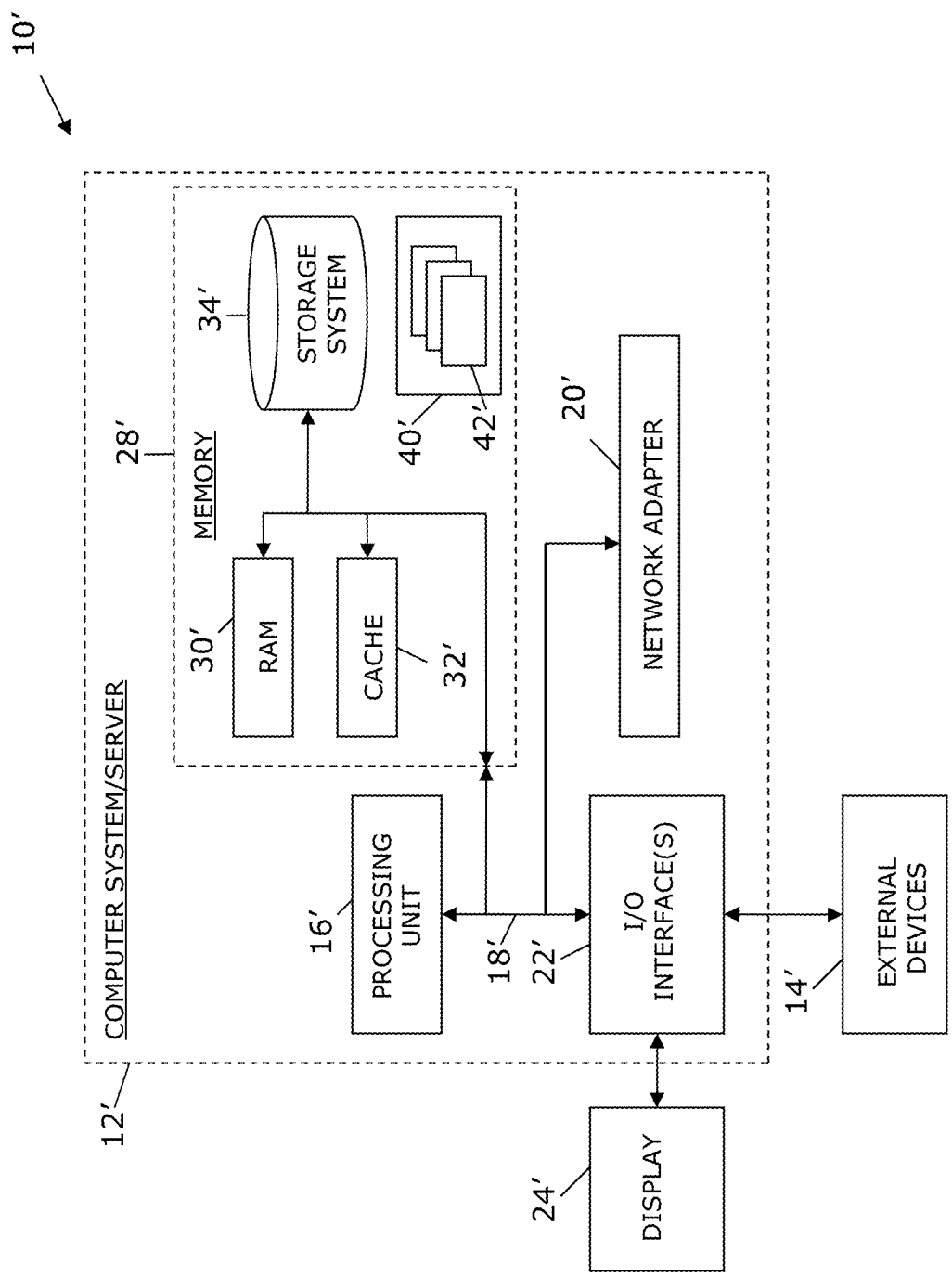
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
providing, on a display device, a communications window, wherein the communications window comprises a request for user input to start a conversation with an online assistant;
receiving the user input, wherein the user input identifies a request by a user to be completed by the online assistant;
updating, based upon the request, a portion of the communications window, wherein the communications window comprises a summary of the conversation including the user input and wherein the portion comprises the user input, wherein the updating comprises updating the user input by adding a plurality of prepopulated variable terms within the communications window and embedded within the user input, wherein the plurality of prepopulated variable terms are visually distinguished from the user input, wherein the updated communications window allows user interaction to adjust the summary including adjustment of the plurality of prepopulated variable terms, wherein each of the prepopulated variable terms comprise terms within the communications window that can be changed during the conversation, wherein at least a subset of the plurality of prepopulated variable terms comprise terms not included in the user input and further refine the user input, wherein at least one of the plurality of prepopulated variable terms represents an assumption by the online assistant based upon the user input and is populated utilizing crowd-sourced information identifying a popular term selection for the at least one of the plurality of prepopulated variable terms in view of attributes of the user;
providing, responsive to an indication of selection by the user of one of the plurality of prepopulated variable terms, a selector and suggestions associated with the selector for changing the one of the plurality of prepopulated terms, wherein the suggestions are overlaid within the communications window and in proximity to the one of the plurality of prepopulated variable terms, wherein a type of the selector is based upon a data type of the selected one of the plurality of prepopulated variable terms; and
iteratively updating the communications windows based upon user input adjusting the summary, wherein the updating comprises updating the selected at least one of the plurality of prepopulated variable terms based upon the user input, wherein the user input adjusting the summary comprises the user selecting the selector and one of the provided suggestions associated with the selector for the selected at least one of the plurality of prepopulated variable terms, wherein during at least one iteration the updating comprises adding at least one new prepopulated variable term embedded within the user input and responsive to the user selecting one of the suggestions.

2. The method of claim 1, wherein at least one of the plurality of prepopulated variable terms is based upon history of the user.

3. The method of claim 1, wherein the updated communications window comprises a displayed result, wherein the displayed result comprises a response to the user input by the online assistant.

4. The method of claim 1, wherein each of the plurality of prepopulated variable terms are annotated with a data type.

5. An apparatus, comprising:
at least one processor; and
a computer readable storage medium having computer readable program code embodied therewith and executable by the at least one processor, the computer readable program code comprising computer readable program code that:
provides, on a display device, a communications window, wherein the communications window comprises a request for user input to start a conversation with an online assistant;
receives the user input, wherein the user input identifies a request by a user to be completed by the online assistant;
updates, based upon the request, the communications window, a portion of the communications window, wherein the communications window comprises a summary of the conversation including the user input and wherein the portion comprises the user input, wherein the updating comprises updating the user input by adding a plurality of prepopulated variable terms within the communications window and embedded within the user input, wherein the plurality of prepopulated variable terms are visually distinguished from the user input, wherein the updated communications window allows user interaction to adjust the summary including adjustment of the plurality of prepopulated variable terms, wherein each of the prepopulated variable terms comprise terms within the communications window that can be changed during the conversation, wherein at least a subset of the plurality of prepopulated variable terms comprise terms not included in the user input and further refine the user input, wherein at least one of the plurality of prepopulated variable terms represents an assumption by the online assistant based upon the user input and is populated utilizing crowd-sourced information identifying a popular term selection for the at least one of the plurality of prepopulated variable terms in view of attributes of the user;
provides, responsive to indication of selection by the user of one of the plurality of prepopulated variable terms, a selector and suggestions associated with the selector for changing the one of the plurality of prepopulated terms, wherein the suggestions are overlaid within the communications window and in proximity to the one of the plurality of prepopulated variable terms, wherein a type of the selector is based upon a data type of the selected one of the plurality of prepopulated variable terms; and
iteratively updates the communications windows based upon user input adjusting the summary, wherein the updating comprises updating the selected at least one of the plurality of prepopulated variable terms based upon the user input, wherein the user input adjusting the summary comprises the user selecting the selector and one of the provided suggestions associated with the selector for the selected at least one of the plurality of prepopulated variable terms, wherein during at least one iteration the updating comprises adding at least one new prepopulated variable term embedded within the user input and responsive to the user selecting one of the suggestions.

6. A computer program product, comprising:
a computer readable storage medium having computer readable program code embodied therewith, the computer readable program code executable by a processor and that:
provides, on a display device, a communications window, wherein the communications window comprises a request for user input to start a conversation with an online assistant;
receives the user input, wherein the user input identifies a request by a user to be completed by the online assistant;
updates, based upon the request, the communications window, a portion of the communications window, wherein the communications window comprises a summary of the conversation including the user input and wherein the portion comprises the user input, wherein the updating comprises updating the user input by adding a plurality of prepopulated variable terms within the communications window and embedded within the user input, wherein the plurality of prepopulated variable terms are visually distinguished from the user input, wherein the updated communications window allows user interaction to adjust the summary including adjustment of the plurality of prepopulated variable terms, wherein each of the prepopulated variable terms comprise terms within the communications window that can be changed during the conversation, wherein at least a subset of the plurality of prepopulated variable terms comprise terms not included in the user input and further refine the user input, wherein at least one of the plurality of prepopulated variable terms represents an assumption by the online assistant based upon the user input and is populated utilizing crowd-sourced information identifying a popular term selection for the at least one of the plurality of prepopulated variable terms in view of attributes of the user;
provides, responsive to indication of selection by the user of one of the plurality of prepopulated variable terms, a selector and suggestions associated with the selector for changing the one of the plurality of prepopulated terms, wherein the suggestions are overlaid within the communications window and in proximity to the one of the plurality of prepopulated variable terms, wherein a type of the selector is based upon a data type of the selected one of the plurality of prepopulated variable terms; and
iteratively updates the communications windows based upon user input adjusting the summary, wherein the updating comprises updating the selected at least one of the plurality of prepopulated variable terms based upon the user input, wherein the user input adjusting the summary comprises the user selecting the selector and one of the provided suggestions associated with the selector for the selected at least one of the plurality of prepopulated variable terms, wherein during at least one iteration the updating comprises adding at least one new prepopulated variable term embedded within the user input and responsive to the user selecting one of the suggestions.

7. The computer program product of claim 6, wherein at least one of the plurality of prepopulated variable terms are based upon a history of the user.

8. The computer program product of claim 6, wherein the updated communications window comprises a displayed result, wherein the displayed result comprises a response to the user input by the online assistant.

9. The computer program product of claim 6, wherein each of the plurality of prepopulated variable terms are annotated with a data type.

10. A method, comprising:
utilizing at least one processor to execute computer code that performs the steps of:
providing a chatbot display window corresponding to a chatbot and allowing a user to interact with an online assistant, wherein the chatbot display window requests user input;
receiving, at the chatbot, the user input, wherein the user input provides instructions to the online assistant;
updating, based upon the user input, a portion of the chatbot display window, wherein the updated chatbot display window comprises (i) a returned result based upon the instructions and (ii) a summary including the user input, wherein the portion comprises the user input, wherein the updating comprises updating the user input by adding additional user adjustable terms within the chatbot display window and embedded within the user input, wherein the additional user adjustable terms are visually distinguished from the user input, wherein the user adjustable terms are populated based upon an inferred user intent, wherein each of the user adjustable terms comprise terms within the chatbot display window that can be changed, by the user, during the conversation, wherein at least a subset of the user adjustable terms comprise terms not included in the user input and further refine the user input, wherein at least one of the user adjustable terms represents an assumption by the online assistant based upon the user input and is populated utilizing crowd-sourced information identifying a popular term selection for the at least one of the user adjustable terms in view of attributes of a user providing the user input;
providing, responsive to an indication of selection by the user of one of the user adjustable terms, a selector and suggestions associated with the selector for changing the one of the user adjustable terms, wherein the suggestions are overlaid within the chatbot display window and in proximity to the one of the user adjustable terms, wherein a type of the selector is based upon a data type of the selected one of the plurality of prepopulated variable terms; and
iteratively updating the chatbot display window based upon the user providing at least one selection of the selector and a suggestion associated with the selector for the one of the user adjustable terms, wherein the updating comprises updating the selected one of the user adjustable terms based upon the at least one selection wherein during at least one iteration the updating comprises adding at least one new user adjustable term embedded within the user input and responsive to the user selecting one of the suggestions.

* * * * *